US011989166B2

(12) United States Patent
Liang et al.

(10) Patent No.: US 11,989,166 B2
(45) Date of Patent: May 21, 2024

(54) SYSTEMS AND METHODS FOR IMPROVED SERVICING OF QUERIES FOR BLOCKCHAIN DATA

(71) Applicant: Coinbase, Inc., Oakland, CA (US)

(72) Inventors: Leo Liang, Oakland, CA (US); Jie Zhang, Oakland, CA (US); Wisam Dakka, Oakland, CA (US); Xiaolei Peng, Oakland, CA (US)

(73) Assignee: Coinbase, Inc., Oakland, CA (US)

( * ) Notice: Subject to any disclaimer, the term of this patent is extended or adjusted under 35 U.S.C. 154(b) by 0 days.

(21) Appl. No.: 17/935,002

(22) Filed: Sep. 23, 2022

(65) Prior Publication Data

US 2024/0104071 A1   Mar. 28, 2024

(51) Int. Cl.
*G06F 16/00* (2019.01)
*G06F 8/36* (2018.01)
*G06F 16/215* (2019.01)
*G06F 16/903* (2019.01)

(52) U.S. Cl.
CPC .............. *G06F 16/215* (2019.01); *G06F 8/36* (2013.01); *G06F 16/903* (2019.01)

(58) Field of Classification Search
CPC .................................................. G06F 16/903
See application file for complete search history.

(56) References Cited

U.S. PATENT DOCUMENTS

2019/0342084 A1* 11/2019 Mehedy ................ H04L 9/0643

* cited by examiner

*Primary Examiner* — Ajith Jacob
(74) *Attorney, Agent, or Firm* — Perkins Coie LLP

(57) ABSTRACT

Methods and systems are described herein for a decision layer of a multi-layer data platform. The decision layer may process application queries and serve the queries based on a dataset of previously generated and indexed data or, as a last resort, queries the blockchain node directly. Using indexed blockchain data to serve application queries reduces latency and downtime of traditional systems that direct queries to blockchain nodes immediately. Furthermore, the decision layer overcomes high latency and downtime issues associated with a pool of load-balanced nodes by reducing the number of direct queries to a blockchain. When applications rely on data directly queried from a blockchain, they are susceptible to limited availability, a problem that the decision layer mitigates with indexed and updated blockchain data.

20 Claims, 5 Drawing Sheets

...

SYSTEMS AND METHODS FOR IMPROVED SERVICING OF QUERIES FOR BLOCKCHAIN DATA

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized, such that facilitation, management, and/or verification of blockchain-based operations is governed or administered not by any one authority but instead by a community of users. The blockchain may therefore remain distributed (e.g., on a network of computers that communicate and coordinate their actions by passing messages to one another) and, in many cases, public, through a digital ledger that records the series of blocks forming the chain. Notably, because each block depends on a preceding block, edits to existing blocks in the chain may not be made without affecting subsequent blocks.

Furthermore, blockchain is also spreading to realms beyond cryptocurrencies and smart contracts as web technologies progress to Web 3.0, which relies heavily on blockchain applications including applications that are hosted in a decentralized manner instead of the typical centralized server. This form of decentralized application can use blockchain to facilitate many of the processing, hosting, and storage needs of a traditional application. Decentralized applications need to regularly query decentralized storage solutions such as a blockchain for data pertinent to application operations. The way in which decentralized applications query this data can affect factors such as latency and throughput which can be noticeable to an end user.

Scalability and availability are two challenges with blockchain technologies as high costs of hardware and increasing traffic on the blockchain network may strain blockchain resources. For example, as more data is added to the blockchain, the hardware necessary to process and store data associated with the blockchain increases. Hardware includes storage media such as hard drives but also processing components such as graphics processing units ("GPUs"). Hard drives and GPUs increase the expense of operating blockchain nodes on the blockchain. The higher expenses will lead to fewer participating nodes and thus increased latency and availability of blockchain resources.

Additionally, as more nodes are added to a blockchain there is more network traffic as every transaction on a blockchain must be broadcasted to all nodes. As more nodes are added to the network, more transmissions must occur. An increase in nodes and transmissions strains the blockchain network infrastructure and may reduce availability and scalability due to downtime. Further excorticating this problem, a common consensus mechanism used in popular blockchains is proof-of-work. Proof-of-work requires significant computational power and energy to validate blocks and verify transactions. As blockchain adaptation grows and block sizes increase accordingly, the computational power required to validate new blocks will increase. An increase in required computational power further reduces the number of available nodes and thus increases latency and reduces the availability of blockchain resources.

SUMMARY

Systems and methods are described herein for novel uses and/or improvements to blockchains and blockchain technology. As one example, systems and methods are described herein for increasing the availability and scalability of applications that rely on accessing blockchain data. The systems and methods accomplish this through improved servicing of queries for blockchain data.

For example, the use of applications that rely on querying blockchain data is growing exponentially. To query blockchain data, systems conventionally query blockchain nodes directly. Querying the blockchain nodes directly is not the most efficient means of accessing blockchain data. Often directly querying the blockchain nodes results in an overall increased latency and an increased likelihood of downtime for the application. As such, conventional systems suffer from high latency or downtime. To mitigate the high latency and downtime, conventional systems use load-balanced nodes; however, load-balanced nodes offer only limited improvements to latency and/or resolving downtime issues.

To overcome technical deficiencies in conventional systems, systems and methods disclosed herein increase the volume and frequency of nodes accessed. Furthermore, the systems and methods disclosed herein implement a decision layer that determines when, if at all, querying a blockchain node is necessary. Querying a blockchain node as a last resort reduces application latency and downtime. For example, unlike conventional systems, the decision layer helps triage a high volume of incoming queries. By diverting some queries from directly accessing the blockchain node, the system can reduce latency and downtime. Accordingly, the systems and methods provide a way to access data in blockchain nodes without overwhelming the system, thereby reducing latency and downtime.

In some aspects, systems and methods disclosed herein overcome the high latency or downtime associated with conventional systems by frequently updating indexed blockchain data. Frequently updating indexed blockchain data reduces the need to query the blockchain in response to every application query. Querying a blockchain directly requires more resources than querying indexed blockchain data. Frequently updating the indexed blockchain data helps reduce the likelihood that querying the blockchain data directly in response to an application query is necessary.

In some aspects, systems and methods for improving servicing of queries for blockchain data are described. For example, the system may receive, at a first layer of a multi-layer data platform, a first query for first on-chain data of a blockchain network from a first application. The system may determine, at the first layer of the multi-layer data platform, a first query characteristic of the first query. The system may determine, based on the first query characteristic, whether the first query can be served by a first dataset or a second dataset and in response to determining that the first query cannot be served by the first dataset or the second dataset. The system may generate, at the first layer of the multi-layer data platform, a second query, to a blockchain node of the blockchain network, for the first on-chain data. The system may receive, from the blockchain node, a first response to the second query, wherein the first response comprises the first on-chain data, and transmit the first on-chain data to the first application.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
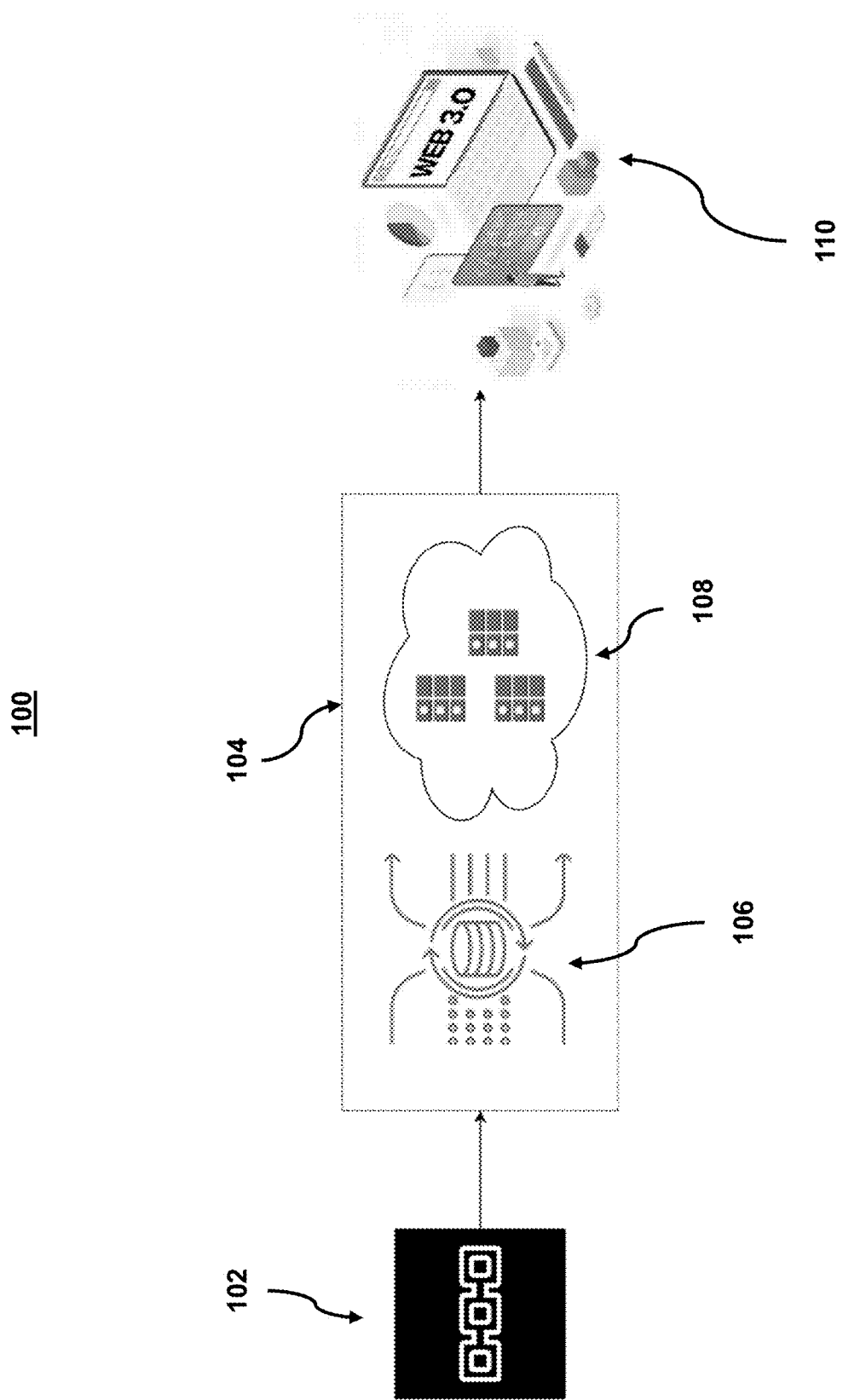
FIG. 1 shows an illustrative diagram for a system to improve servicing of application queries, in accordance with one or more embodiments.

FIG. 1 shows an illustrative diagram for a system to improve servicing of application queries, in accordance with one or more embodiments. For example, FIG. 1 includes blockchain node 102, decision layer 104, and applications 110 (e.g., a decentralized application). For example, FIG. 1 illustrates how change-data-capture 106 and cloud storage 108 work together to index and re-index various query patterns. System 100 departs from conventional solutions in that the number of blockchain nodes necessary to facilitate a high volume of requests is substantially reduced due to the indexing and updating facilitated by decision layer 104. For example, the chain-data-capture will determine the data in the blockchain that changed since the last time the system checked and stored the updated date on the cloud. By regularly updating the index, decision layer 104, can serve queries to a multitude of applications faster than accessing the blockchain directly, especially when multiple applications submit the same or similar queries in a short timeframe. By storing data on the cloud, expenses related to maintaining distributed and redundant servers are reduced. This makes individual queries less expensive than if the data was stored off the cloud. As such, the system may reduce the time, energy, number of nodes and other resources consumed when applications query the blockchain. This leads to lower latency and downtime for the application.

The system may use blockchain nodes. As referred to herein, a "blockchain node" may include a computer that stores a complete history of the ledger and may validate new transactions to the blockchain. In some embodiments, the blockchain nodes may comprise multiple blockchain nodes that have identical ledgers, which helps ensure data integrity across the blockchain. In some embodiments, the blockchain node data may be accessed by an API such as JSON-RPC.

In some embodiments, the system may determine a blockchain node by referencing a blockchain network. For example, by determining a blockchain node by referencing a blockchain network, the system may help assure data integrity across the blockchain network by validating new blocks or assure data availability across the blockchain network by storing the whole or part of the blockchain.

The system may use collections. As referred to herein, a "collection" may include a logical group of blockchain entities. In some embodiments, the collection may comprise a set of blocks. In some embodiments, the collection may comprise a set of transactions. In some embodiments, the collection may comprise a set of logs.

In some embodiments, the system may determine collections by accessing a blockchain and grouping blocks highlighted by the change-data-capture. For example, by determining collections by accessing a blockchain and grouping blocks, the system may allow applications to quickly access fresh data from the blockchain without making an expensive call directly to the blockchain. Additionally or alternatively, by determining collections by accessing a blockchain and grouping logs, the system is provided with a comprehensive view of changes made on a blockchain. By allowing the system to be appraised of changes in the blockchain, the system can index fresh data at the appropriate intervals.

The system may use checkpoints. As referred to herein, a "checkpoint" may include an index value, the block sequence, and the block height. In some embodiments, the checkpoint may comprise one of two global checkpoints.

In some embodiments, the system may determine checkpoints by accessing the block sequence and the block height. For example, by determining checkpoints by accessing the block sequence and block height, the system may keep track of the last processed location of a collection. Additionally or alternatively, the system may determine a checkpoint by keeping track of the last processed location of all collections. For example, by determining a checkpoint by keeping track of the last processed location of all collections, the system may be able to serve the latest blockchain data in response to a query from an application. Additionally or alternatively, the system may determine checkpoints by storing the starting location. For example, by determining checkpoints by storing the starting location, the system may reference the starting location even when the starting location does not coincide with the genesis block for a respective blockchain.

The system may use a block sequence. As referred to herein, a "block sequence" may include a mono-increasing sequence number for the block stream. In some embodiments, the system may determine a block sequence by modeling changes as a strictly ordered sequence of added (+)

or removed (−) events. For example, by determining a block sequence by modeling changes as a strictly ordered sequence, the system may implement the change-data-capture pattern more easily, as the canonical chain can be reconstructed by grouping the events by height and taking the item with the largest sequence number from each group.

The system may use a query characteristic. As referred to herein, a "query characteristic" may include a metric describing limiting factors or factors to filter received data when processing requests for blockchain data. For example, a query characteristic may comprise a data requirement for data being requested by an application.

In some embodiments, the system may determine a "query characteristic" by assessing the query received from an application and determining factors that must be considered when serving a query. For example, by determining a query characteristic, the system may limit datasets used to serve an application query by characteristics such as a latency metric, freshness metric, and throughput metric.

The system may use a blockchain characteristic. As referred to herein, a "blockchain characteristic" may include attributes of a blockchain, blockchain data, and/or datasets featuring blockchain data. The system may use a blockchain characteristic (e.g., in conjunction with a query characteristic) to limit or filter data in response to an application query. For example, when determining whether or not a request for data may be served by a given dataset, the system may compare one or more blockchain characteristics of the dataset (or data in the dataset) to one or more query characteristics.

In some embodiments, blockchain characteristics may be used in conjunction with query characteristics to help serve blockchain data from a blockchain or a dataset with indexed blockchain data in response to an application query. For example, if a query characteristic specifies a latency of P95 less than 100 milliseconds (i.e., 95 percent of queries must have a latency of 100 milliseconds or lower) and a blockchain characteristic specifies a latency of P95 less than 98 milliseconds (i.e., 95 percent of blockchain node responses have a latency of 98 milliseconds or lower), then the system can serve the query with the blockchain based on both the query characteristic and the blockchain characteristic.

One example of a blockchain characteristic is a data storage paradigm. As referred to herein, a "data storage paradigm" may include various ways of storing data. For example, the system may reference a data storage paradigm used in a dataset when determining if that dataset may serve a query.

In some embodiments, the data storage paradigm includes a key-value database, wherein the key-value database uses a key to access a value. A key-value database would be advantageous in that the database stores values in main memory, allowing for quick retrieval. A key-value database would be an optimal data storage paradigm if a query characteristic specified a low latency. A key-value database may not be the appropriate data storage paradigm if large volumes of data are being queried, as there are limits to the amount of data that can be stored.

In some embodiments, the data storage paradigm includes a relational database, wherein the relational database uses a primary key to coordinate multiple relations (i.e., tables). A relational database is a data storage paradigm that allows for easy optimization and lower error rates, however a schema is required making it difficult to adjust in real time. A relational database may be a suitable data storage paradigm in a situation where blockchain data is indexed into a predefined schema that is unlikely to change or if there is a large volume of data that needs to be stored.

The system may use a freshness metric. As referred to herein, a "freshness metric" may include a metric used to determine how recently data was updated by pulling real-time, on-chain data from a blockchain. A freshness metric is type of query characteristic.

In some embodiments, the freshness metric may specify an acceptable period that can elapse before the data on the blockchain is updated. For example, an application may send a query to decision layer 104 with a query characteristic for freshness that may specify a one-minute update interval, meaning that data must be updated within the last minute. Decision layer 104 may determine to serve the query with a dataset that can meet the query characteristic requirement, update the dataset so it can comply with the query, and/or submit the query directly to a blockchain. Alternatively, the freshness metric may be specified as a delay in comparison to a block time, wherein a block time refers to the time used by the blockchain. For example, the freshness query characteristic may specify a less than 150-second delay in comparison to the block time. A 150-second delay in comparison to block time means that updates are required, every 150 seconds or less, to maintain data freshness.

The system may use a latency metric. As referred to herein, a "latency metric" may include a metric used to determine an acceptable amount of delay in responding to a query from an application. A latency metric is a type of query characteristic.

In some embodiments, the latency metric may specify a percentile of queries that must be served within a specified timeframe. For example, if a latency metric specifies a latency of P95 less than 100 milliseconds, then 95 percent of queries must be served within 100 milliseconds or less.

The system may use a throughput metric. As referred to herein, a "throughput metric" may include a metric used to determine an acceptable number of requests processed over a specified timeframe. A throughput metric is a type of query characteristic.

In some embodiments, a throughput metric may specify the number of requests that must be processed over a specified timeframe. For example, an application query may include a throughput metric requirement of 1.5 k rps (1,500 requests per second). When decision layer 104 responds to the application query, it may select a dataset or blockchain that can process 1.5 k rps.

Figure 2:
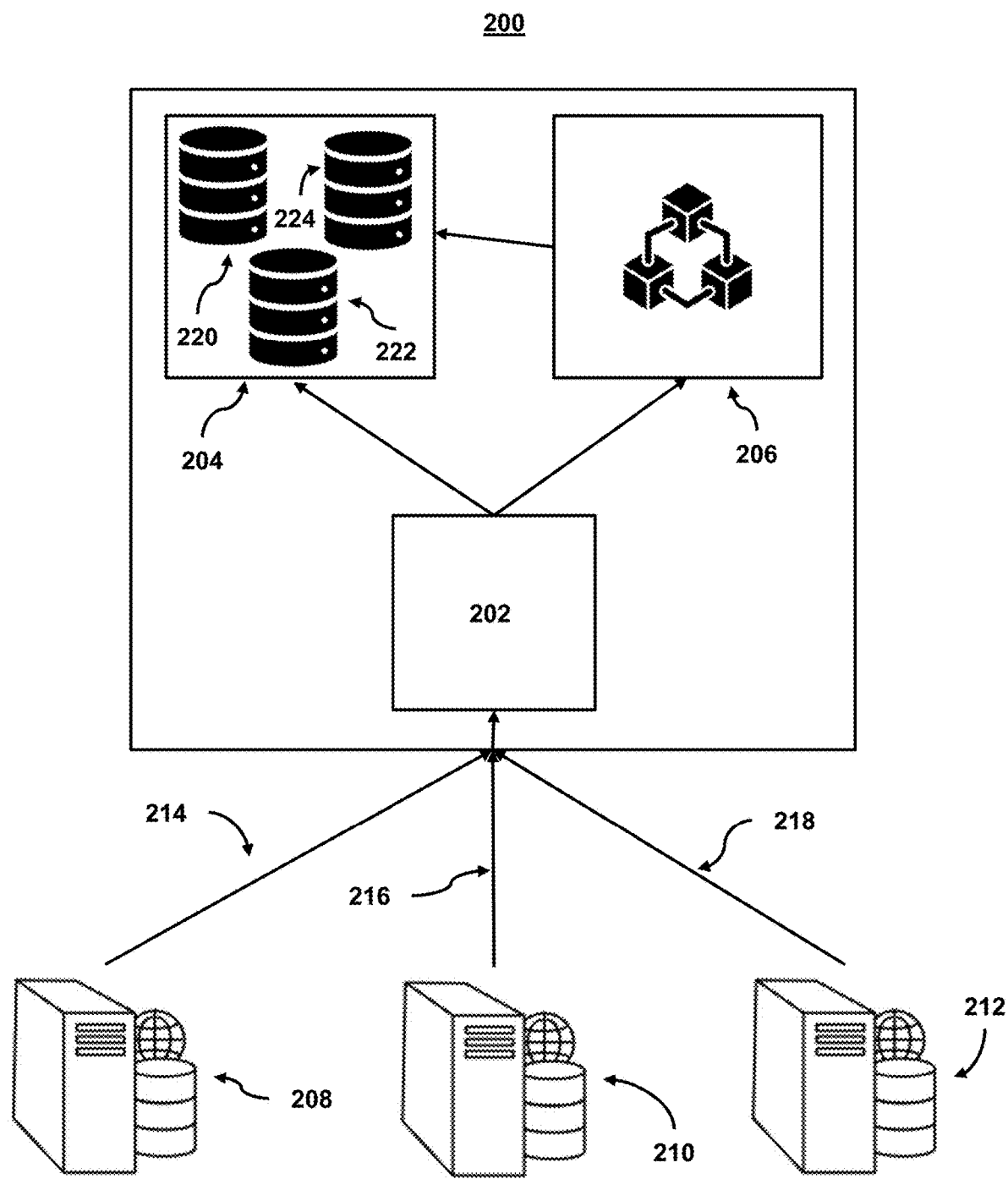
FIG. 2 shows an illustrative diagram of applications sending queries to a decision layer of a multi-layer data platform requesting blockchain data, in accordance with one or more embodiments.

FIG. 2 shows an illustrative diagram of applications sending queries to a decision layer of a multi-layer data platform to receive blockchain data, in accordance with one or more embodiments. For example, the diagram presents various components that may be used to improve servicing of queries for blockchain data from applications, in some embodiments.

FIG. 2 includes decision layer 202 and multiple applications (e.g., application 208, application 210, or application 212). Each of the applications may send multiple queries requesting data from a blockchain. Conventionally, when queries are processed, the system does not retrieve data from the indexed blockchain data. Instead, the system accesses the blockchain. Accessing the blockchain directly for every query is time-consuming and inefficient.

As shown in FIG. 2, system 200 may include multiple applications. The applications in the system send queries using an application programming interface ("API") (e.g., API 214, API 216, or API 218) of an application (e.g., application 208, application 210, or application 212). Each of the APIs may facilitate the transfer of blockchain data when decision layer 202 receives queries. Each of the applications use APIs to direct queries to decision layer 202. Decision layer 202 may consult previous queries to determine if the query is cached in the indexed blockchain data 204. If the query was recently conducted and query characteristics such as the freshness, latency, and throughput have not become obsolete, decision layer 202 may return a response to the query from the indexed blockchain data 204. Alternatively, if decision layer 202 determines that query characteristics such as the freshness, latency, and throughput are obsolete, decision layer 202 may query blockchain 206 directly or use blockchain 206 and an additional query to update indexed blockchain data 204.

For example, in some embodiments, the system may use an indexer service to generate indexed blockchain data 204. The indexer service may fetch raw data (e.g., data related to a current state and/or instance of a blockchain) from a node of a blockchain network (e.g., as described above). The indexer service may then process the data and store it in a database and/or data structure in an efficient way to provide quick access to the data. For example, the indexer service may publish and/or record a subset of blockchain operations that occur for a blockchain. Accordingly, for subsequent blockchain operations, the indexer service may reference indexed blockchain data 204 as opposed to a node of blockchain to provide various services.

For example, the indexer service may store a predetermined list of blockchain operations to monitor for and/or record in an index. These may include blockchain operations (e.g., "operation included," "operation removed," "operation finalized") related to a given type of blockchain operation (e.g., "transaction," "external transfer," internal transfer," "new contract metadata," "ownership change," etc.) as well as blockchain operations related to a given protocol, protocol subgroup, and/or other characteristic (e.g., "ETH," "ERC20," and/or "ERC721"). Additionally and/or alternatively, the various blockchain operations and metadata related to those blockchain operations (e.g., block designations, user accounts, time stamps, etc.) as well as an aggregate of multiple blockchain operations (e.g., total blockchain operations amounts, rates of blockchain operations, rate of blockchain updates, etc.) may be monitored and/or recorded.

The indexer service may likewise provide navigation and search features (e.g., support Boolean operations) for the indexed blockchain operations. In some embodiments, the indexer service may apply one or more formatting protocols to generate representations of indexed blockchain operations in a human-readable format. In some embodiments, the indexer service may also tag blockchain operations based on whether or not the blockchain operation originated for a local user account (e.g., a user account corresponding to a custodial account) and/or a locally hosted digital wallet. The indexer service may determine whether a blockchain operation contains relevant information for users of the indexer service by storing information about whether an address is an internal address of the indexer service or one used in a digital wallet hosted by a predetermined wallet service.

As shown in FIG. 2, the multi-layer data platform may comprise a plurality of datasets, each with their own respective characteristics. The datasets may transition from a lower quality to a higher quality dataset (e.g., transition from raw data to highly curated data).

For example, the multi-layer data platform may comprise a dataset 220. Dataset 220 may receive raw on-chain data (e.g., hexadecimal encoded data) from one or more blocks of a blockchain network via a blockchain node. Dataset 220 may be populated by the system transforming the raw on-chain data to a first format. For example, dataset 220 may comprise a structured data structure defined in protocol buffers (Protobuf) format. For example, Protobuf is a data format used to serialize structured data. Protobuf comprises an interface description language that describes the structure of some data and a program that generates source code from that description for generating or parsing a stream of bytes that represents the structured data. For example, the first dataset may use a schema that associates data types with field names, using integers to identify each field. That is, the data may contain only the numbers, not the field names, which generates bandwidth/storage savings as compared with schemas that include the field names in the data.

Dataset 220 may comprise a blockchain-interface layer and may use a compute engine, wherein the compute engine comprises a first workflow architecture, wherein the first workflow architecture comprises a first threshold for workflow throughout and a first threshold for a number of workflows. For example, the system may select a compute engine for processing data in the first data dataset based on the workflow architecture of the compute engine. For example, the main limitation of a workflow architecture with a low threshold for workflow throughout (e.g., a threshold rate at which events may be processed) and a high threshold number of workflows (e.g., a threshold number of workflows that may simultaneously process events) is in data processing situations with a high amount of aggregation. For example, a workflow architecture with a low threshold for workflow throughout and a high threshold number of workflows has a limited throughput for each workflow, but this workflow architecture allows for the total number of workflows to be high. Such a workflow architecture is well suited for a dataset based on events corresponding to individual workflows (e.g., updates for given smart contracts, tokens, etc.). For example, a workflow architecture of this type may aggregate events per smart contract, token, etc., for millions of different smart contracts, tokens, etc., as the rate of events for each of these is low (e.g., less than 30 events per second). In contrast, such a workflow architecture may be ill suited for processing a dataset and/or use cases involving a high number of events in a low number of workflows. Additionally, the system may select a second compute engine (e.g., for the same or another layer and/or dataset) for processing data in a dataset based on the workflow architecture of the second compute engine. Furthermore, as the second dataset comprises on-chain data for a plurality of blocks, the workflow architecture for the second compute may require the ability to process a high rate of events. For example, as the second dataset processes and stores data at a different level of granularity, the second compute engine may require fewer individual workflows (e.g., a lower threshold of a number of workflows) and instead a higher rate of event processing (e.g., a high threshold for workflow throughput).

Dataset 222 may comprise, at a data lakehouse layer, a dataset that receives first on-chain data in the first format. The data lakehouse layer may transform the first on-chain data to a second format, using a second compute engine, for storage in a second dataset, wherein the second format comprises a columnar oriented format, wherein the second dataset comprises the first on-chain data and second on-chain data, and wherein the second on-chain data is from a second block on the blockchain network. For example, while the first dataset may comprise structured on semi-structured raw blockchain data, and thus delay error-prone parsing and data augmentation until later, raw blockchain data (even in a structured or semi-structured format) is difficult to use to run applications. For example, to speed up the reprocessing of the raw blockchain data, the system may build different batch processing pipelines; however, the underlying code cannot be reused for streaming processing. As such, a data lakehouse layer may comprise a different data structure type. A data lakehouse is a data solution concept that combines elements of the data warehouse with those of the data lake. Data lakehouses implement data warehouses' data structures and management features for data lakes, which are typically more cost-effective for data storage.

For example, the second dataset may comprise a columnar oriented format, which is best fitted for analytic workloads. For example, the second dataset may represent a cleansed and partitioned dataset (e.g., in contrast to the first dataset, which may comprise raw blockchain data, and the third dataset, which may be curated based on application use cases). For example, the columnar oriented format may preserve local copies (files) of remote data on worker nodes, which may avoid remote reads during instances of a high-volume of event processing.

Dataset 224 may comprise an application service layer that receives the first on-chain data and the second on-chain data in the second format (or other format of another layer). The application service layer may transform, using a third compute engine, the first on-chain data and the second on-chain data to a third format for storage in a third dataset, and wherein the third format is dynamically selected based on the application characteristic. Furthermore, the third dataset may be structured based on application needs. Additionally, the dataset may be continuously and incrementally updated based on information received from lower layers and/or the blockchain node, as well as information received by an API layer of an application. The third dataset may therefore be customized to meet the needs and formatting requirements of the API for the application. For example, the system may serve an API layer of the application. In such cases, the format used by the application service layer may be based on the API layer.

For example, the API layer of the applications can subscribe to a Kafka topic to perform further processing. For example, asset discovery of ERC-20, ERC-721, ERC-1155, etc., can be implemented this way. As one example, an application service layer may be responsible for producing the transfer events based on the token standards, and then an Asset Discovery Service (or other layer) may pull in additional on-chain (e.g., symbol/decimals) and off-chain (e.g., token icon) metadata asynchronously. An optimization may also be done in an application service layer to deduplicate the transfer events of the same address using time-based window aggregation. That is, the application service layer may use specific formats and perform specific operations based on the needs of an application and/or the best mechanism for optimizing the application (and/or its interactions with other layers/applications/data sources).

Figure 3:
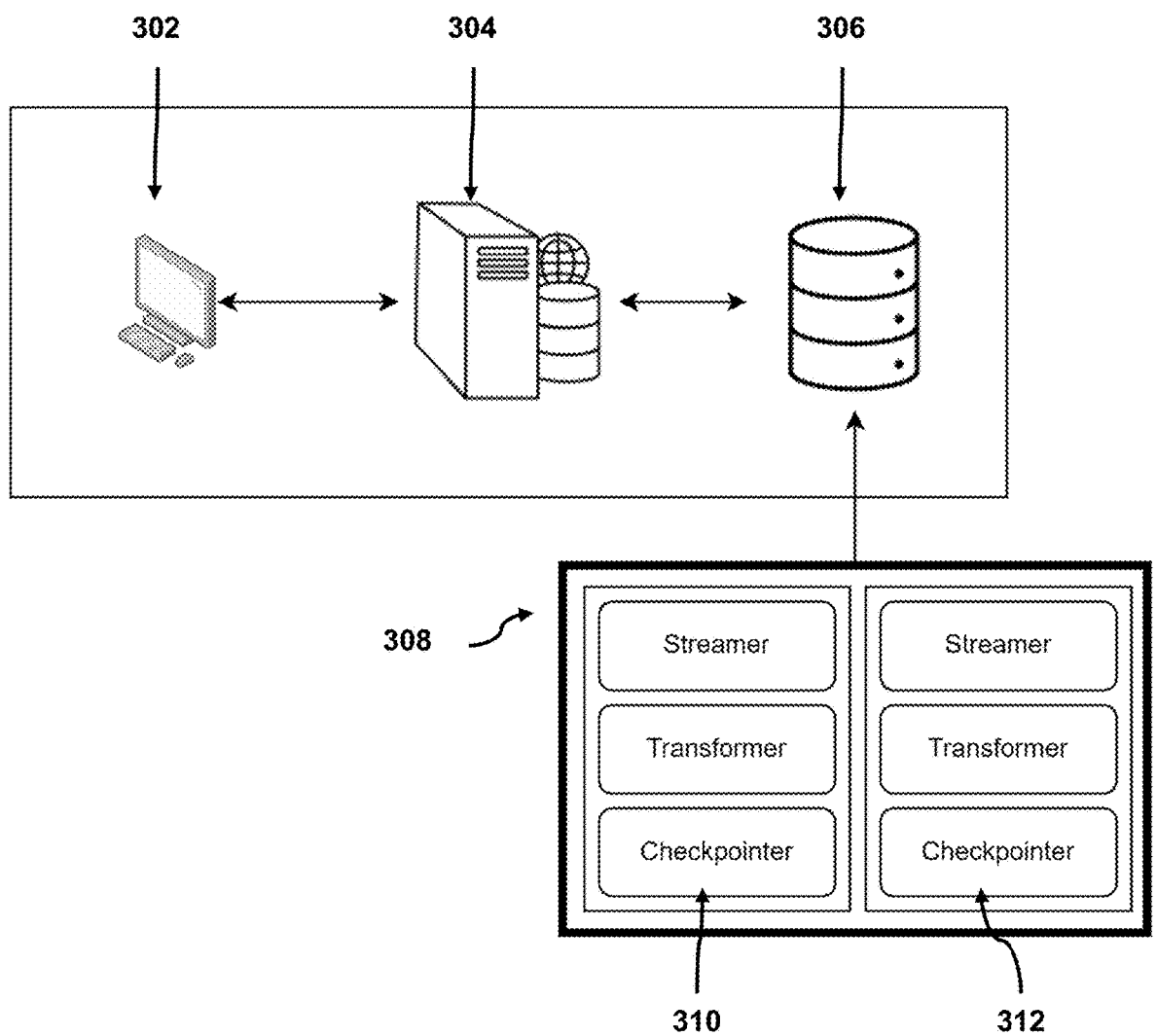
FIG. 3 shows an in-depth illustrative diagram for updating indexed blockchain data used by a decision layer of a multi-layer data platform, in accordance with one or more embodiments.

FIG. 3 shows an in-depth illustrative diagram for updating indexed blockchain data used by a decision layer of a multi-layer data platform, in accordance with one or more embodiments. For example, in some embodiments, system 300 may improve servicing of queries for blockchain data and transmit on-chain data in response to a request from an application within a decentralized application environment. System 300 includes coordinator 308. Coordinator 308 manages primary ingester 310 and one or more secondary ingesters 312. Primary ingester 310 and one or more secondary ingesters 312 include a streamer, transformer, and checkpointer. The coordinator orchestrates the ingesters to provide fresh blockchain data to the indexed data. The primary ingester 310 is responsible for maintaining the latest checkpoint.

Replicating the on-chain data and storing it in dataset 306 is essential to serve user queries up-to-date, indexed blockchain data. Ingester 310 and ingester 312 are responsible for ingesting data using three components. The streamer is responsible for collating blocks of relevant blockchain events into block events. The transformer is responsible for converting the block events into target objects that allow for easier integration with an API. The checkpointer is the last processing step and adds the last processed sequence into a checkpoint table. Each collection should have its own checkpoint which allows ingesters to run independently of each other. The primary ingester's checkpointer is responsible for committing the latest checkpoint.

Additionally, the user device 302 may run an application (or another suitable program). The application may cause the processors and/or control circuitry to perform operations related to improving servicing of queries for blockchain data and transmitting on-chain data in response to a request from an application within a decentralized application environment.

System 300 includes user device 302. It should be noted that, while shown as a personal computer in FIG. 3, the user devices may be any type of computing device, including, but not limited to, a laptop computer, a tablet computer, a handheld computer, and/or other computing equipment (e.g., a server), including "smart," wireless, wearable, and/or mobile devices. The user device may be used to interact with an application that queries the blockchain or indexed on-chain data in response to a query.

System 300 includes decision layer 304 which processes queries from an application on or accessed by user device 302. If certain blockchain characteristics, like freshness, latency, or throughput are present within the cached data, then the system will consult the cached blockchain data. When blockchain data is cached, it is stored in dataset 306. Dataset 306 is fed by the coordinator 308.

The system may use tables. As referred to herein, a "table" may include one or more collections. In some embodiments, the system may determine tables by using a temporal workflow comprising a streamer, transformer, and a checkpointer. For example, by determining tables using a temporal workflow, the system may convert on-chain data to a key-value store that allows access to on-chain data. In some embodiments, the system may use a single-table design, which allows for easy scalability without capacity complications that accompany SQL.

Figure 4:
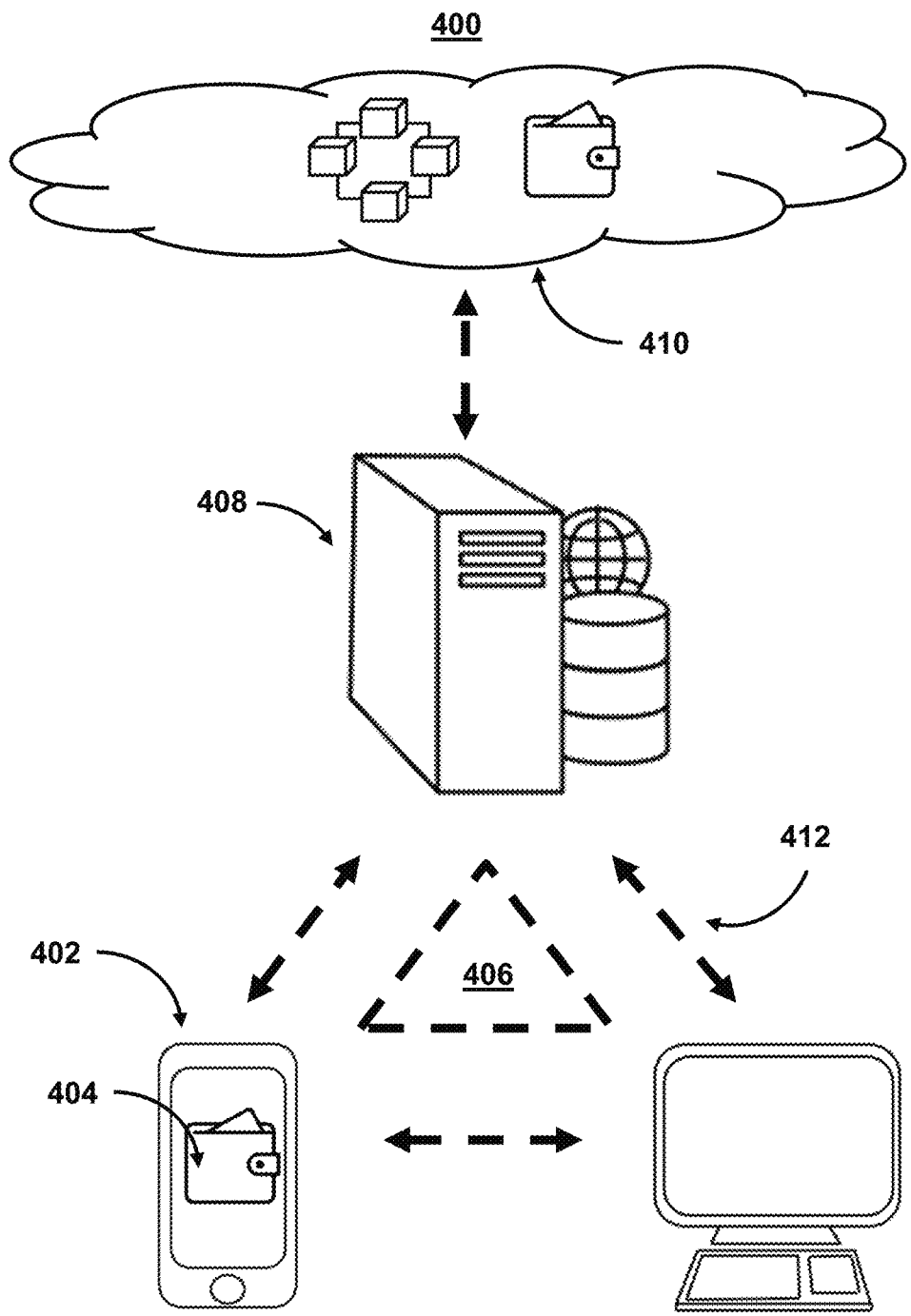
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or application programming interfaces (APIs) in order for improved servicing of queries for blockchain data. For example, application 404 may comprise a decentralized application digital wallet and/or wallet service that is able to sign and send transactions to transfer tokens and/or perform other blockchain operations as well as interact with one or more decentralized applications.

System 400 also includes API layer 406. In some embodiments, API layer 406 may be implemented on user device 402. Alternatively or additionally, API layer 406 may reside on one or more cloud components (e.g., server 408). For example, API layer 406 may reside on a server 408 and comprise a platform service for a custodial wallet service, decentralized application, etc. API layer 406 (which may be a representational state transfer (REST) or web services API layer) may provide a decoupled interface to data and/or functionality of one or more applications.

API layer 406 may provide various low-level and/or blockchain-specific operations in order to facilitate improved servicing of queries for blockchain data. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, the API layer 406 may maintain internal records and balances without relying on external verification (e.g., which may take up to ten minutes based on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. Simple Object Access Protocol ("SOAP") web services have traditionally been adopted in the enterprise for publishing internal services as well as for exchanging information with partners in business-to-business ("B2B") transactions.

API layer 406 may use various architectural arrangements. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers such as API layer 406, services, and applications are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer 406 against common web exploits, bots, and denial-of-service (DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an application and/or a software-based system that securely stores users' payment information, private keys, and/or passwords facilitating blockchain operations with websites, nodes, and/or other devices. In some embodiments, a wallet service may also provide additional ledger access (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, however, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. This is achieved in practice for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system— blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user account's positions if system 400 stores them independently from a given blockchain. Furthermore, in case of forks, system 400 performs some internal remediation on user accounts, which is enabled by system 400 maintaining a layer of insultation, from the blockchain, for remedial blockchain operations. For example, system 400 may have a separate storage, protected by the second ledger (e.g., a ledger service), for reads, and by a transfer service, for writes, that reflect the state of the blockchain that is relevant for system 400 purposes.

In some embodiments, the system may also use one or more Application Binary Interfaces (ABIs). An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain, which are executed on EVM. Smart contracts written in high-level languages like Solidity or Vyper may be compiled in EVM executable bytecode by the system. Upon deployment of the smart contract, the bytecode is stored on the blockchain and is associated with an address. To access functions defined in high-level languages, the system translates names and arguments into byte representations for byte code to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parseable format, doing translations between human-intended method calls and smart-contract operations discoverable and reliable.

For example, ABI defines the methods and structures used to interact with the binary contract similar to an API, but on a lower-level. The ABI indicates the caller of the function to encode (e.g., ABI encoding) the needed information like function signatures and variable declarations in a format that the EVM can understand to call that function in bytecode. ABI encoding may be automated by the system using compilers or wallets interacting with the blockchain.

Figure 5:
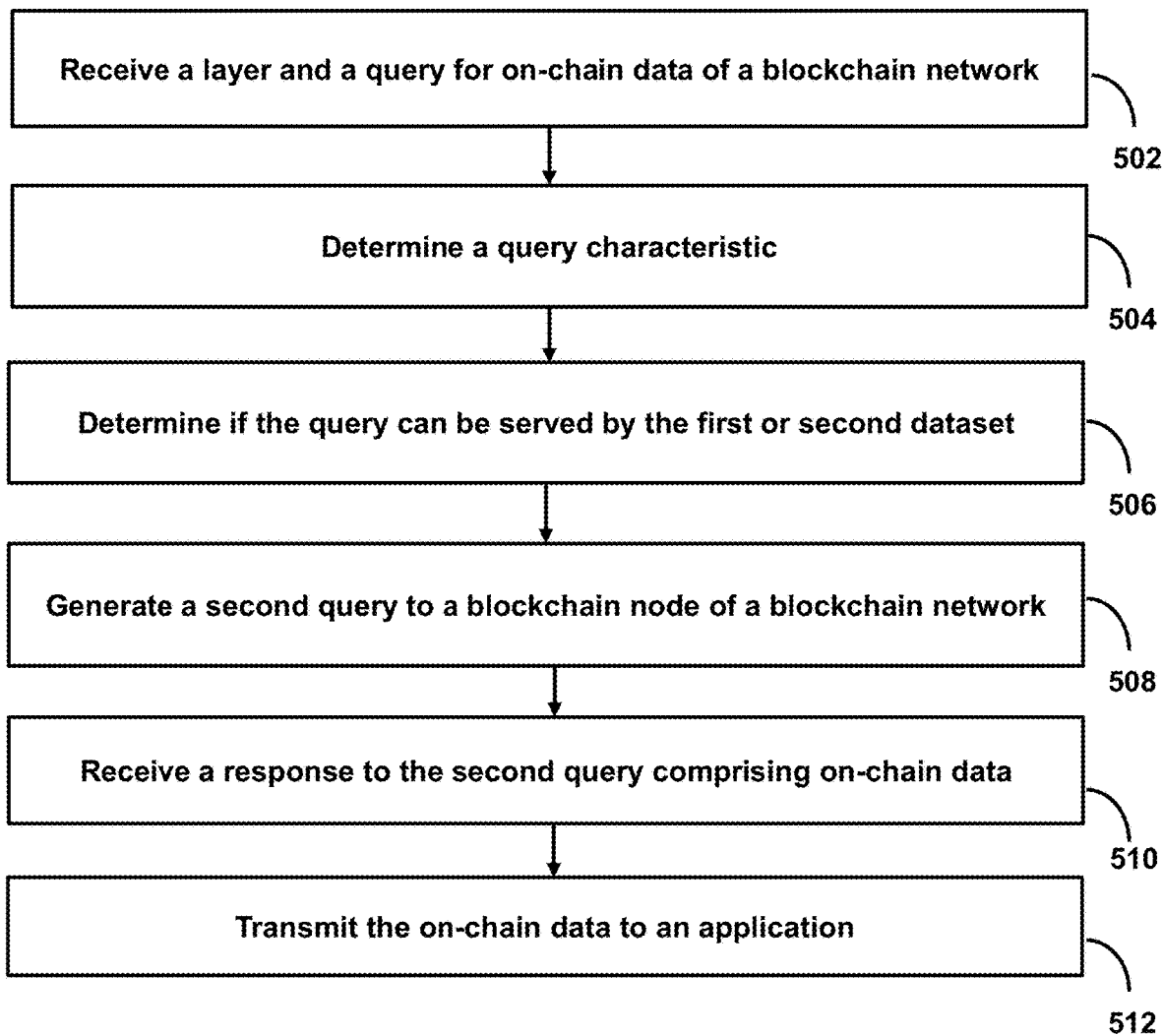
FIG. 5 shows a flowchart of the steps involved in servicing of queries for blockchain data, in accordance with one or more embodiments.

FIG. 5 shows a flowchart of the steps involved in improving servicing of queries for blockchain data and transmitting on-chain data in response to a request from an application within a decentralized application environment, in accordance with one or more embodiments. For example, the system may use process 500 (e.g., as implemented on one or more system components described above) in order to more easily service queries to a blockchain from applications.

At step 502, process 500 (e.g., using one or more components described above) receives a layer and a query for on-chain data of a blockchain network. For example, the system may receive a first layer of a multi-layer data platform and a first query for first on-chain data of a blockchain network from a first application. The system may receive a request for transaction history associated with a wallet ID on a blockchain. By doing so, the system may be able to process the query on either the blockchain directly or via indexed blockchain data.

At step 504, process 500 (e.g., using one or more components described above) determines a query characteristic of an application query. For example, the system may determine, at the first layer of the multi-layer data platform, a first query characteristic of the first query. For example, a query may specify a desired freshness of blockchain data. Specifically, the system may require the blockchain data to have been indexed within the last 15 seconds, and any blockchain data with a freshness metric greater than 15 seconds is not desirable. By doing so, the system may ensure that the application's query is served with appropriate data while maintaining the benefits of indexing blockchain data, including overcoming high latency and/or downtime issues.

In some embodiments, the system determines a blockchain characteristic and determines if the query can be served by either the first or the second dataset. For example, the system may determine a first blockchain characteristic of the first on-chain data; and determines based on the first blockchain characteristic, whether the first query can be served by the first dataset or the second dataset. For example, if an application sends a query requesting blockchain data that falls within certain parameters, then the system may determine, based on related blockchain characteristics, which of the two datasets is better suited to serving the application query. By doing so, the system may select a dataset that is best suited to a query, thereby providing a lower latency and higher throughput than if the application queried a blockchain directly.

At step 506, process 500 (e.g., using one or more components described above) determines which of two datasets can be used to serve the query. For example, the system may determine, based on the first query characteristic, whether the first query can be served by a first dataset or a second dataset. For example, the system may determine that the desired query characteristic and actual query characteristic are divergent and thus dataset one needs to be accessed over dataset two. In another scenario, it may be the case that the system may use dataset two because the desired query characteristics matches the actual query characteristics. By doing so, the system may respond to application queries with data in line with the desired query characteristics while maximizing efficiency gains from indexing blockchain data periodically with a decision layer of a multi-layer data platform.

In some embodiments, the system determines a latency requirement for a query which includes determining latency metrics for both the first and second datasets and comparing the latency metrics of the two datasets. For example, the system, wherein determining the first query characteristic of the first query comprises determining a first latency requirement for the first query, and wherein determining whether the first query can be served by the first dataset or the second dataset comprises determining a first latency metric for the first dataset, determining a second latency metric for the second dataset, and comparing the first latency requirement to the first latency metric and the second latency metric. For example, if an application query specifies a latency of less than 3 milliseconds, the system may determine a latency of 3.2 milliseconds when querying the first dataset and 1.8 milliseconds for the second dataset, then compare the latency metrics to determine that the first dataset has a lower latency than the second dataset. By doing so, the system may serve blockchain data in response to application queries with limited latency, which improves the efficiency of receiving data from datasets.

In some embodiments, determining a latency requirement for the query comprises determining a latency percentile requirement and a latency duration threshold. For example, the system may determine the first latency requirement for the first query comprising determining a latency percentile requirement and determining a latency duration threshold. For example, the latency requirement may indicate a percentile of requests that were below the latency duration threshold. By doing so, the system may improve the response time when serving application queries.

In some embodiments, determining the latency metric comprises determining a latency duration threshold, a respective latency for queries to the first dataset and a percentage of queries in which the respective latency exceeds the latency duration threshold. For example, the system determining the first latency metric for the first dataset comprises determining a latency duration threshold, determining a respective latency for queries to the first dataset, and determining a percentage of the queries in which the respective latency exceeds the latency duration threshold. For example, the latency duration threshold may comprise the latency metric for a dataset corresponding to a percentage of queries (e.g., 95 percent, 50 percent, etc.) to a dataset in which the respective latency of the queries (e.g., as measured in seconds, microseconds, etc.) exceeds the threshold latency (e.g., 100 ms, 50 ms, etc.). By determining the first latency metric, the system may consider the time it takes multiple queries to access a dataset, which allows the system to serve application queries while minimizing latency.

In some embodiments, determining the first query characteristic comprises determining a throughput metric for both datasets and then comparing them. For example, the system may determine the first query characteristic of the first query by determining a first throughput requirement for the first query, wherein determining whether the first query can be served by the first dataset or the second dataset comprises determining a first throughput metric for the first dataset, determining a second throughput metric for the second dataset, and comparing the first throughput requirement to the first throughput metric and the second throughput metric. For example, the first query characteristic may be based on the throughput of queries from the first dataset. For example, the first query characteristic may increase the throughput requirement based on the throughput queries from the first dataset. By comparing the throughput metric for both datasets, the system may serve application queries without unnecessary restrictions in throughput, thereby increasing the speed and efficiency of the system when serving application queries.

In some embodiments, determining the throughput metric includes determining throughput speeds for queries to the dataset, determining average throughput speed based on respective throughput speeds, and determining throughput metric based on throughput speed. For example, the system may determine the first throughput metric for the first dataset by determining respective throughput speeds for queries to the first dataset, determining an average throughput speed based on the respective throughput speeds, and determining the first throughput metric based on the average throughput speed. For example, the system, based on the throughput speeds for previous queries, may determine that the average throughput speed is 1.2 k requests per second. By determining the throughput metric based on the throughput speed, the system may be able to determine which dataset is more efficient to serve application queries.

In some embodiments, determining a query characteristic includes determining a data freshness requirement for the query by determining data freshness metrics for both the first and second dataset, then comparing the metrics. For example, the system may determine the first query characteristic of the first query comprising determining a first data freshness requirement for the first query, wherein determining whether the first query can be served by the first dataset or the second dataset comprises determining a first data freshness metric for the first dataset, determining a second data freshness metric for the second dataset, and comparing the first data freshness requirement to the first data freshness metric and the second data freshness metric. For example, the system may determine the freshness metric for a dataset that was recently updated. The system may also determine the freshness metric for a dataset that was not recently updated. The system can compare the recently updated dataset with the not recently updated data and, based on the freshness metric, determine the appropriate dataset to reference when serving an application query. By comparing the freshness metrics of the datasets, the system may serve application queries with relevant blockchain data and avoid serving outdated data.

In some embodiments, the system may determine the freshness metric by considering the rate at which data in the dataset is updated. For example, the system may determine the first data freshness metric for the first dataset which comprises determining a rate at which data in the first dataset is updated and determining the first data freshness metric based on the rate. For example, the data freshness metric for a dataset may correspond to a rate at which a dataset is updated (e.g., in seconds, milliseconds, etc.). By determining the freshness metric by considering the rate at which data in a dataset is updated, the system can provide results that are fresh enough to serve in response to an application query.

In some embodiments, the system determines a characteristic of a query, a data storage paradigm requirement for a query, and which dataset is most appropriate to serve the query by determining a first data storage paradigm for a first dataset and a second data storage paradigm for a second dataset and comparing the first and second data storage paradigms. For example, the system may determine the first query characteristic of the first query, which comprises determining a first data storage paradigm requirement for the first query, wherein determining whether the first query can be served by the first dataset or the second dataset comprises determining a first data storage paradigm for the first dataset, determining a second data storage paradigm for the second dataset, and comparing the first data storage paradigm requirement to the first data storage paradigm and the second data storage paradigm. For example, the first query characteristic may be based on the data storage paradigms that are supported by the datasets. For example, the system may determine a minimum acceptable freshness metric for a dataset. By doing so, the system may be able to meet certain query characteristic requirements, thereby reducing latency of blockchain queries.

In some embodiments, the first dataset is based on on-chain data encoded in hexadecimal from a block in the blockchain network and the second dataset is based on converting the first dataset format into a second format comprising a columnar oriented format. For example, the system may populate the first dataset by receiving the first on-chain data from a blockchain node of a blockchain network, wherein the first on-chain data comprises hexadecimal encoded data from a first block of the blockchain network, wherein the second dataset is populated based on transforming the first on-chain data in a first format to a second format, and wherein the second format comprises a columnar oriented format. For example, a first dataset comprises raw blockchain data and a second dataset comprises the same data reformatted into a format that is more readable. By creating two datasets, the system has multiple methods of serving application queries depending on the importance of query characteristics.

At step 508, process 500 (e.g., using one or more components described above) generates a second query to a blockchain node of a blockchain network. For example, in response to determining that the first query cannot be served by the first dataset or the second dataset, the system may generate, at the first layer of the multi-layer data platform, a second query, to a blockchain node of the blockchain network, for the first on-chain data. For example, if the first query contains query characteristics that cannot be met by the indexed blockchain data, the system may posit a query directly to the blockchain. While querying the blockchain directly is not as efficient as querying indexed blockchain data, by querying the blockchain directly, the system allows query characteristics such as data freshness to be met.

In some embodiments, the system determines a second query to access on-chain data by determining a query characteristic and the associated dataset to serve the query. The system then generates a third query to access on-chain data stored in the appropriate dataset and receives on-chain data in response to the third query, transmitting the received data to the application thereby serving the application query. For example, the system may comprise receiving, at a first layer of the multi-layer data platform, a second query for second on-chain data of the blockchain network from the first application, determining, at the first layer of the multi-layer data platform, a second query characteristic of the first query, determining, based on the second query characteristic, whether the second query can be served by the first dataset or the second dataset and, in response to determining that the second query can be served by the first dataset or the second dataset, generating, at the first layer of the multi-layer data platform, a third query to the first dataset or the second dataset. The system may further comprise receiving, from the blockchain node, a second response to the third query, wherein the second response comprises the second on-chain data and transmitting the second on-chain data to the first application. For example, if the system determined that, based on a second query characteristic indicating a latency metric of less than 2 milliseconds, the first dataset is most apt to serve the query, the system would generate a third query in order to serve the necessary data for the second query from the application. By doing so, the system may present the application with data from a dataset that meets the query characteristic requirements, thereby ensuring relevant data is served in response to an application query.

At step 510, process 500 (e.g., using one or more components described above) receives a response to the second query comprising on-chain data. For example, the system may receive, from the blockchain node, a first response to the second query, wherein the first response comprises the first on-chain data. For example, if the system sends a second query to access transactions on a blockchain within a certain timeframe, the first response comprises the relevant blockchain data. By doing so, the system may provide an application with blockchain data that meets all the specified query characteristics.

At step 512, process 500 (e.g., using one or more components described above) transmits the on-chain data to an application. For example, the system may transmit the first on-chain data to the first application. For example, in response to an application's query for blockchain data from a specified walletID, the system may transmit the on-chain data related to the specified walletID. By providing the relevant on-chain data, the system helps applications query the blockchain without compromising throughput, speed, freshness, or other query characteristics.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising receiving, at a first layer of a multi-layer data platform, a first query for first on-chain data of a blockchain network from a first application, determining, at the first layer of the multi-layer data platform, a first query characteristic of the first query, determining, based on the first query characteristic, whether the first query can be served by a first dataset or a second dataset, in response to determining that the first query cannot be served by the first dataset or the second dataset, generating, at the first layer of the multi-layer data platform, a second query to a blockchain node of the blockchain network, for the first on-chain data, receiving, from the blockchain node, a first response to the second query, wherein the first response comprises the first on-chain data, and transmitting the first on-chain data to the first application.

2. The method of any one of the preceding embodiments, further comprising determining a first blockchain characteristic of the first on-chain data, and determining, based on the first blockchain characteristic, whether the first query can be served by the first dataset or the second dataset.

3. The method of any one of the preceding embodiments, further comprising receiving, at first layer of the multi-layer data platform, a second query for second on-chain data of the blockchain network from the first application, determining, at the first layer of the multi-layer data platform, a second query characteristic of the first query, determining, based on the second query characteristic, whether the second query can be served by the first dataset or the second dataset, in response to determining that the second query can be served by the first dataset or the second dataset, generating, at the first layer of the multi-layer data platform, a third query to the first dataset or the second dataset, receiving, from the blockchain node, a second response to the third query, wherein the second response comprises the second on-chain data, and transmitting the second on-chain data to the first application.

4. The method of any one of the preceding embodiments, wherein determining the first query characteristic of the first query comprises determining a first latency requirement for the first query, and wherein determining whether the first query can be served by the first dataset or the second dataset comprises determining a first latency metric for the first dataset, determining a second latency metric for the second dataset, and comparing the first latency requirement to the first latency metric and the second latency metric.

5. The method of any one of the preceding embodiments, wherein determining the first latency requirement for the first query comprises determining a latency percentile requirement and determining a latency duration threshold.

6. The method of any one of the preceding embodiments, wherein determining the first latency metric for the first dataset comprises determining a latency duration threshold, determining a respective latency for queries to the first dataset, and determining a percentage of the queries in which the respective latency exceeds the latency duration threshold.

7. The method of any one of the preceding embodiments, wherein determining the first query characteristic of the first query comprises determining a first throughput requirement for the first query, and wherein determining whether the first query can be served by the first dataset or the second dataset comprises determining a first throughput metric for the first dataset, determining a second throughput metric for the second dataset, and comparing the first throughput requirement to the first throughput metric and the second throughput metric.

8. The method of any one of the preceding embodiments, wherein determining the first throughput metric for the first dataset comprises determining respective throughput speeds for queries to the first dataset, determining an average throughput speed based on the respective throughput speeds, and determining the first throughput metric based on the average throughput speed.

9. The method of any one of the preceding embodiments, wherein determining the first query characteristic of the first query comprises determining a first data freshness requirement for the first query, and wherein determining whether the first query can be served by the first dataset or the second dataset comprises determining a first data freshness metric for the first dataset, determining a second data freshness metric for the second dataset, and comparing the first data freshness requirement to the first data freshness metric and the second data freshness metric.

10. The method of any one of the preceding embodiments, wherein determining the first data freshness metric for the first dataset comprises determining a rate at which data in the first dataset is updated and determining the first data freshness metric based on the rate.

11. The method of any one of the preceding embodiments, wherein determining the first query characteristic of the first query comprises determining a first data storage paradigm requirement for the first query, and wherein determining whether the first query can be served by the first dataset or the second dataset comprises determining a first data storage paradigm for the first dataset, determining a second data storage paradigm for the second dataset, and comparing the first data storage paradigm requirement to the first data storage paradigm and the second data storage paradigm.

12. The method of any one of the preceding embodiments, wherein the first dataset is populated based on receiving the first on-chain data from a blockchain node of a blockchain network, wherein the first on-chain data comprises hexadecimal encoded data from a first block of the blockchain network, wherein the second dataset is populated based on transforming the first on-chain data in a first format to a second format, wherein the second format comprises a columnar oriented format.

13. A tangible, non-transitory, machine-readable medium storing instructions that, when executed by a data processing apparatus, cause the data processing apparatus to perform operations comprising those of any of embodiments 1-12.

14. A system comprising one or more processors; and memory storing instructions that, when executed by the processors, cause the processors to effectuate operations comprising those of any of embodiments 1-12.

15. A system comprising means for performing any of embodiments 1-12.

What is claimed is:

1. A system for improved servicing of queries for blockchain data, the system comprising:
    a first dataset, wherein the first dataset is populated based on receiving first on-chain data from a blockchain node of a blockchain network, wherein the first on-chain data comprises hexadecimal encoded data from a first block of the blockchain network;
    a second dataset, wherein the second dataset is populated based on transforming the first on-chain data in a first format to a second format, wherein the second format comprises a columnar oriented format; and
    a multi-layer data platform comprising one or more processors and non-transitory computer-readable media storing instructions that, when executed by the one or more processors, cause operations comprising:
        receiving, from a first application, a first query for the first on-chain data of the blockchain network;
        determining a first query characteristic of the first query;
        determining a first blockchain characteristic of the first on-chain data;
        determining, based on the first query characteristic and the first blockchain characteristic, whether the first query can be served by the first dataset or the second dataset;
        in response to determining that the first query cannot be served by the first dataset or the second dataset, generating a second query to the blockchain node for the first on-chain data;
        receiving, from the blockchain node, a first response to the second query, wherein the first response comprises the first on-chain data; and
        transmitting the first on-chain data to the first application.

2. A method for improved servicing of queries for blockchain data, the method comprising:
    receiving, at a first layer of a multi-layer data platform, a first query for first on-chain data of a blockchain network from a first application;
    determining, at the first layer of the multi-layer data platform, a first query characteristic of the first query;
    determining, based on the first query characteristic, whether the first query can be served by a first dataset or a second dataset;
    in response to determining that the first query cannot be served by the first dataset or the second dataset, generating, at the first layer of the multi-layer data platform, a second query, to a blockchain node of the blockchain network, for the first on-chain data;
    receiving, from the blockchain node, a first response to the second query, wherein the first response comprises the first on-chain data; and
    transmitting the first on-chain data to the first application.

3. The method of claim 2, further comprising:
determining a first blockchain characteristic of the first on-chain data; and
determining, based on comparing the first query characteristic and the first blockchain characteristic, whether the first query can be served by the first dataset or the second dataset.

4. The method of claim 2, further comprising:
receiving, at the first layer of the multi-layer data platform, at least one query for second on-chain data of the blockchain network from the first application;
determining, at the first layer of the multi-layer data platform, a second query characteristic of the at least one query;
determining, based on the second query characteristic, whether the at least one query can be served by the first dataset or the second dataset;
in response to determining that the at least one query can be served by the first dataset or the second dataset, generating, at the first layer of the multi-layer data platform, a third query to the first dataset or the second dataset;
receiving, from the blockchain node, a second response to the third query, wherein the second response comprises the second on-chain data; and
transmitting the second on-chain data to the first application.

5. The method of claim 2, wherein determining the first query characteristic of the first query comprises determining a first latency requirement for the first query, and wherein determining whether the first query can be served by the first dataset or the second dataset comprises:
determining a first latency metric for the first dataset;
determining a second latency metric for the second dataset; and
comparing the first latency requirement to the first latency metric and the second latency metric.

6. The method of claim 5, wherein determining the first latency requirement for the first query comprises:
determining a latency percentile requirement; and
determining a latency duration threshold.

7. The method of claim 5, wherein determining the first latency metric for the first dataset comprises:
determining a latency duration threshold;
determining a respective latency for queries to the first dataset; and
determining a percentage of the queries in which the respective latency exceeds the latency duration threshold.

8. The method of claim 2, wherein determining the first query characteristic of the first query comprises determining a first throughput requirement for the first query, and wherein determining whether the first query can be served by the first dataset or the second dataset comprises:
determining a first throughput metric for the first dataset;
determining a second throughput metric for the second dataset; and
comparing the first throughput requirement to the first throughput metric and the second throughput metric.

9. The method of claim 8, wherein determining the first throughput metric for the first dataset comprises:
determining respective throughput speeds for queries to the first dataset;
determining an average throughput speed based on the respective throughput speeds; and
determining the first throughput metric based on the average throughput speed.

10. The method of claim 2, wherein determining the first query characteristic of the first query comprises determining a first data freshness requirement for the first query, and wherein determining whether the first query can be served by the first dataset or the second dataset comprises:
determining a first data freshness metric for the first dataset;
determining a second data freshness metric for the second dataset; and
comparing the first data freshness requirement to the first data freshness metric and the second data freshness metric.

11. The method of claim 10, wherein determining the first data freshness metric for the first dataset comprises:
determining a rate at which data in the first dataset is updated; and
determining the first data freshness metric based on the rate.

12. The method of claim 2, wherein determining the first query characteristic of the first query comprises determining a first data storage paradigm requirement for the first query, and wherein determining whether the first query can be served by the first dataset or the second dataset comprises:
determining a first data storage paradigm for the first dataset;
determining a second data storage paradigm for the second dataset; and
comparing the first data storage paradigm requirement to the first data storage paradigm and the second data storage paradigm.

13. The method of claim 2, wherein the first dataset is populated based on receiving the first on-chain data from the blockchain node of the blockchain network, wherein the first on-chain data comprises hexadecimal encoded data from a first block of the blockchain network, wherein the second dataset is populated based on transforming the first on-chain data in a first format to a second format, wherein the second format comprises a columnar oriented format.

14. One or more non-transitory, computer readable media comprising instructions that when executed by one or more processors causes operations comprising:
receiving, at a first layer of a multi-layer data platform, a first query for first on-chain data of a blockchain network from a first application;
determining, at the first layer of the multi-layer data platform, a first query characteristic of the first query;
determining, based on the first query characteristic, whether the first query can be served by a first dataset or a second dataset;
in response to determining that the first query cannot be served by the first dataset or the second dataset, generating, at the first layer of the multi-layer data platform, a second query, to a blockchain node of the blockchain network, for the first on-chain data;
receiving, from the blockchain node, a first response to the second query, wherein the first response comprises the first on-chain data; and
transmitting the first on-chain data to the first application.

15. The one or more non-transitory, computer readable media of claim 14, wherein the instructions further cause operations comprising:
determining a first blockchain characteristic of the first on-chain data; and determining, based on comparing the first query characteristic and the first blockchain characteristic, whether the first query can be served by the first dataset or the second dataset.

16. The one or more non-transitory, computer readable media of claim 14, wherein the instructions further cause operations comprising:
receiving, at the first layer of the multi-layer data platform, at least one query for second on-chain data of the blockchain network from the first application;
determining, at the first layer of the multi-layer data platform, a second query characteristic of the first query;
determining, based on the second query characteristic, whether the at least one query can be served by the first dataset or the second dataset;
in response to determining that the at least one query can be served by the first dataset or the second dataset, generating, at the first layer of the multi-layer data platform, a third query to the first dataset or the second dataset;
receiving, from the blockchain node, a second response to the third query, wherein the second response comprises the second on-chain data; and
transmitting the second on-chain data to the first application.

17. The one or more non-transitory, computer readable media of claim 14, wherein determining the first query characteristic of the first query comprises determining a first latency requirement for the first query, and wherein determining whether the first query can be served by the first dataset or the second dataset comprises:
determining a first latency metric for the first dataset;
determining a second latency metric for the second dataset; and
comparing the first latency requirement to the first latency metric and the second latency metric.

18. The one or more non-transitory, computer readable media of claim 17, wherein determining the first latency requirement for the first query comprises:
determining a latency percentile requirement; and
determining a latency duration threshold.

19. The one or more non-transitory, computer readable media of claim 17, wherein determining the first latency metric for the first dataset comprises:
determining a latency duration threshold;
determining a respective latency for queries to the first dataset; and
determining a percentage of the queries in which the respective latency exceeds the latency duration threshold.

20. The one or more non-transitory, computer readable media of claim 14, wherein determining the first query characteristic of the first query comprises determining a first throughput requirement for the first query, and wherein determining whether the first query can be served by the first dataset or the second dataset comprises:
determining a first throughput metric for the first dataset;
determining a second throughput metric for the second dataset; and
comparing the first throughput requirement to the first throughput metric and the second throughput metric.

\* \* \* \* \*